United States Patent

Kitaori et al.

[11] Patent Number: 5,853,871
[45] Date of Patent: Dec. 29, 1998

[54] MAGNETIC RECORDING MEDIUM

[75] Inventors: Noriyuki Kitaori; Osamu Yoshida; Katsumi Sasaki; Junko Ishikawa; Katsumi Endo, all of Tochigi, Japan

[73] Assignee: Kao Corporation, Tokyo, Japan

[21] Appl. No.: 718,184

[22] Filed: Sep. 19, 1996

[30] Foreign Application Priority Data

Sep. 27, 1995 [JP] Japan .................................. 7-249048

[51] Int. Cl.⁶ .................................................. G11B 5/66
[52] U.S. Cl. ...................... 428/332; 428/336; 428/694 T; 428/694 TS; 428/694 TB; 428/684 TF; 428/684 TC; 428/900
[58] Field of Search .................. 428/394 T, 694 TS, 428/694 TB, 694 TF, 694 TC, 900, 336, 332

[56] References Cited

U.S. PATENT DOCUMENTS

| | | | |
|---|---|---|---|
| 4,873,154 | 10/1989 | Yasunaga | 428/694 T |
| 5,538,802 | 7/1996 | Kitaori | 428/694 T |

OTHER PUBLICATIONS

Docket Number 327–493–0 Ser. No. 08/547,115 Filing or Issue Date Oct. 23, 1995 Status Pending.
Docket Number 327–532–0 Ser. No. 08/598,419 Filing or Issue Date Feb. 8, 1996 Status Pending.
Docket Number 327–565–0 Ser. No. 08/679,117 Filing or Issue Date Feb. 8, 1996 Status Pending.
Docket Number 327–576–0 Ser. No. 08/696,790 Filing or Issue Date Aug. 14, 1996 Status Pending.
Docket Number 327–589–0 Ser. No. 08/715,018 Filing or Issue Date Aug. 17, 1996 Status Pending.
Docket Number 327–591–0 Ser. No. 08/717,727 Filing or Issue Date Sep. 23, 1996 Status Pending.
Docket Number 327–538–0 Ser. No. 08/606,353 Filing or Issue Date Feb. 23, 1996 Status Pending.

*Primary Examiner*—Leszek Kiliman
*Attorney, Agent, or Firm*—Oblon, Spivak, McClelland, Maier & Neustadt, P.C.

[57] ABSTRACT

A magnetic recording medium comprising a substrate, a magnetic layer, a protective layer and a lubricant layer, wherein the magnetic layer is coated on the substrate, the protective layer is coated on the magnetic layer, the lubricant layer is coated on the protective layer, the magnetic layer is an Fe—C—O metal magnetic layer containing Fe, C and O, the protective layer is a diamond-like carbon layer and the lubricant is a fluorine-contained lubricant. The magnetic recording medium using an inexpensive Fe as a magnetic material, has excellent electromagnetic conversion characteristic, durability, corrosion resistance and running capability.

20 Claims, 3 Drawing Sheets

MAGNETIC RECORDING MEDIUM

BACKGROUND OF THE PRESENT INVENTION

The present invention relates to a magnetic recording medium comprising an Fe metal magnetic film.

A magnetic recording medium of a metallic thin film type of which magnetic film is prepared through depositing or spattering process has been well known. Magnetic alloies, for example, Co—Ni, Co—Cr or the like have been used as materials for the magnetic film (layer).

Since those metals, Co, Ni, Cr or the like are expensive, inexpensive metal such as an Fe has been expected for the application. However the whole structure of the magnetic recording medium using the Fe has been under development.

SUMMARY OF THE INVENTION

A first object of the present invention is to provide a magnetic recording medium having an excellent electromagnetic conversion characteristic when using the Fe as a magnetic material.

A second object of the present invention is to provide a magnetic recording medium having an excellent durability.

A third object of the present invention is to provide a magnetic recording medium having an excellent corrosion resistance.

A fourth object of the present invention is to provide a magnetic recording medium having an excellent running capability.

The above objects of the present invention are realized by a magnetic recording medium comprising a substrate, a magnetic layer, a protective layer and a lubricant layer, wherein the magnetic layer is coated on the substrate, the protective layer is coated on the magnetic layer, the lubricant layer is coated on the protective layer, the magnetic layer is an Fe—C—O metal magnetic layer containing Fe, C and O, the protective layer is a diamond-like carbon layer and the lubricant is a fluorine-contained lubricant.

It is preferable to set a composition of the magnetic layer to contain 50 to 90 (particularly 60 to 86) at. % of Fe, 5 to 35 (particularly 7 to 25) at. % of C and 5 to 35 (particularly 7 to 25) at. % of O. The above-specified composition improves both corrosion resistance and video output.

It is preferable that the magnetic layer has a thickness ranging from 800 to 5000 Å (particularly 1000 to 3000 Å). The above-specified magnetic layer thickness further improves the running capability as well as reducing the jitter.

It is preferable that the protective layer has a thickness ranging from 10 to 500 Å (particularly 30 to 200 Å). The above-specified protective layer thickness further improves the durability yet retaining high outputs.

It is preferable that the lubricant layer has a thickness ranging from 5 to 70 Å. The above-specified lubricant layer improves the jitter, yet keeping excellent durability and corrosion resistance.

It is preferable that a back coat layer is provided to the substrate on the surface opposite to the one which has been coated with the magnetic layer. Preferably the back coat layer is a metallic layer.

It is preferable that the back coat layer has a thickness ranging from 1000 to 5000 Å.

Preferably the back coat layer has a fluorine-contained lubricant layer coated thereon.

DETAILED DESCRIPTION OF THE INVENTION

Figure 1:
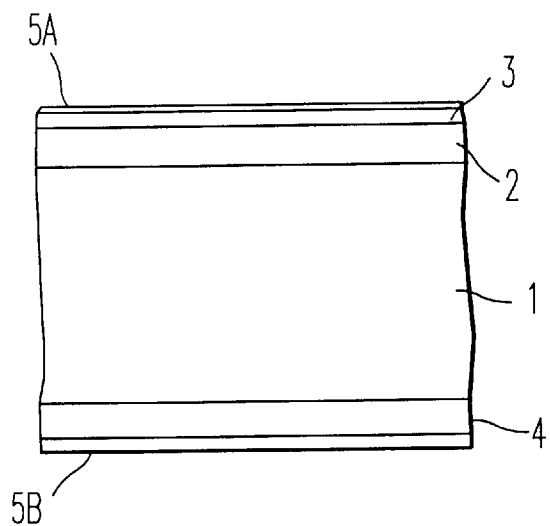
FIG. 1 is a sectional view of a magnetic recording medium of the present invention.

A magnetic recording medium (magnetic tape) of the present invention comprises a substrate 1, a magnetic layer 2, a protective layer 3 and a lubricant layer 5a. Referring to FIG. 1, in more detail, the magnetic recording medium comprises the substrate 1, magnetic layer 2, protective layer 3, a back coat layer 4 and lubricant layers 5a and 5b. The magnetic layer 2 is coated on a surface of the substrate 1. The protective layer 3 is coated on the magnetic layer 2. The back coat layer 4 is coated on the other surface of the substrate 1. The lubricant layer 5a is coated on the protective layer 3. The lubricant layer 5b is coated on the back coat layer 4. The magnetic layer 2 has a thickness ranging from 800 to 5000 Å, and more preferably, 1000 to 3000 Å. The protective layer 3 has a thickness ranging from 10 to 500 Å, and more preferably, 30 to 200 Å. The back coat layer 4 has a thickness ranging from 1000 to 5000 Å, and more preferably, 1500 to 3500 Å. Each thickness of the lubricant layers 5a and 5b ranges from 5 to 70 Å.

The magnetic layer 2 is an Fe—C—O metal magnetic layer containing Fe, C and O. Specifically a composition of the Fe—C—O metal magnetic layer is composed of 50 to 90 at. % of Fe, 5 to 35 at. % of C and 5 to 35 at. % of O, and more preferably, 60 to 86 at. % of Fe, 7 to 25 at. % of C and 7 to 25 at. % of O.

The magnetic layer 2 has a coercive force Hc ranging from 900 to 2400 Oe, and more particularly, 1000 to 1800 Oe.

Figure 2:
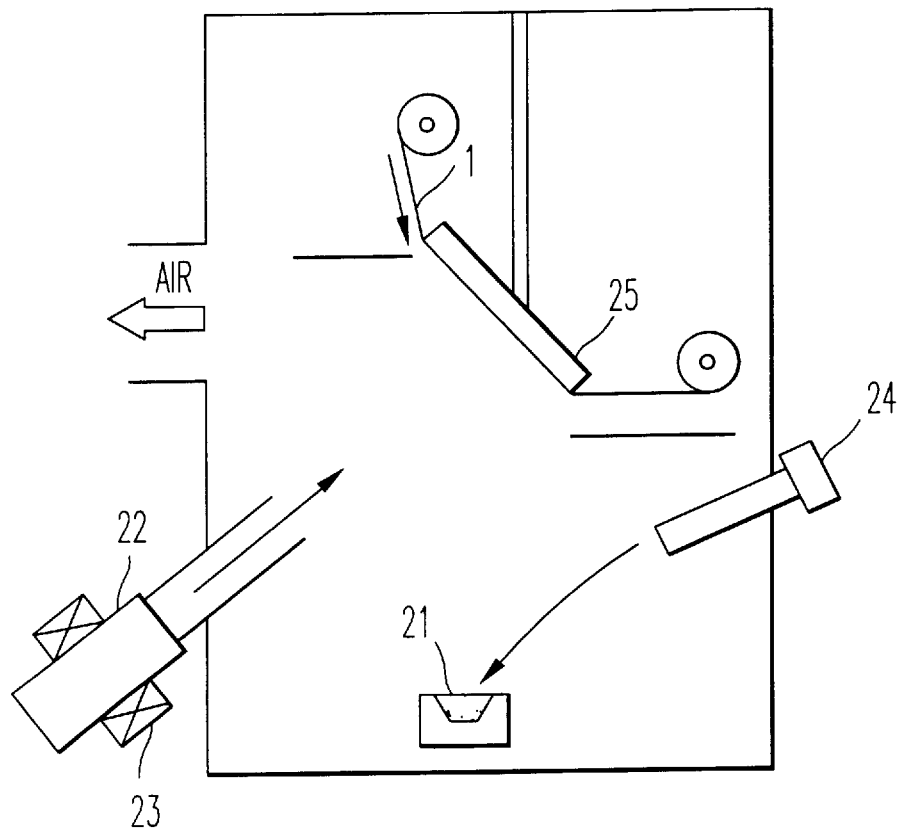
FIG. 2 is a schematic view of an apparatus for producing a magnetic layer of the present invention.

The magnetic layer 2 is produced through a diagonal deposition apparatus shown in FIG. 2. A reference numeral 1 is a substrate and a reference numeral 21 is an Fe metallic material contained in a crucible (evaporation source). Reference numerals 22, 23 and 24 are an ion gun for irradiating carbon ions, an ion gun for irradiating oxygen ions and an electron gun, respectively. The diagonal deposition apparatus is vacuumed until the vacuum degree reaches $10^{-4}$ to $10^{-6}$ Torr. Then electron beam is irradiated to the Fe metallic material 21 for evaporation. As a result, the Fe metallic particles are adhered and deposited on the substrate 1 which has been running. Concurrently carbon ions and oxygen ions (or oxygen gas) are irradiated to the evaporated particle of the Fe metal or the deposited surface thereof. Then the magnetic Fe layer is formed into the Fe—C—O metal magnetic layer. Irradiation amount of the carbon ion or oxygen ion (oxygen gas) is so set that each content Fe, C, O of the magnetic layer is 50 to 90 at. %, 5 to 35 at. % and 5 to 35 at. %, respectively. Since each content of the metallic components other than the Fe is a slight amount (for example, 5 wt. % or less), only Fe, C and O contents are specified.

A guide member 25 shown in FIG. 2 can be replaced by a cool can roll.

The substrate 1 can be formed by either a magnetic material or a non-magnetic material. The substrate 1 is formed by an organic material, for example, polyester such as PET (polyethylene terephthalate), an olefin such as polypropylene, resin such as polyamide, polyimide, polysulfon, polycarbonate and, cellulose resin, a vinyl chloride resin or the like. An undercoat layer is coated on the surface of the substrate 1 for improving the adhesion of the magnetic layer.

A protective layer 3 is coated on a surface of the magnetic layer 2. The protective layer 3 is formed of a material, for example, an oxide, a nitride or a carbide of a metal such as Al. A diamond-like carbon is used in the present invention.

Figure 3:
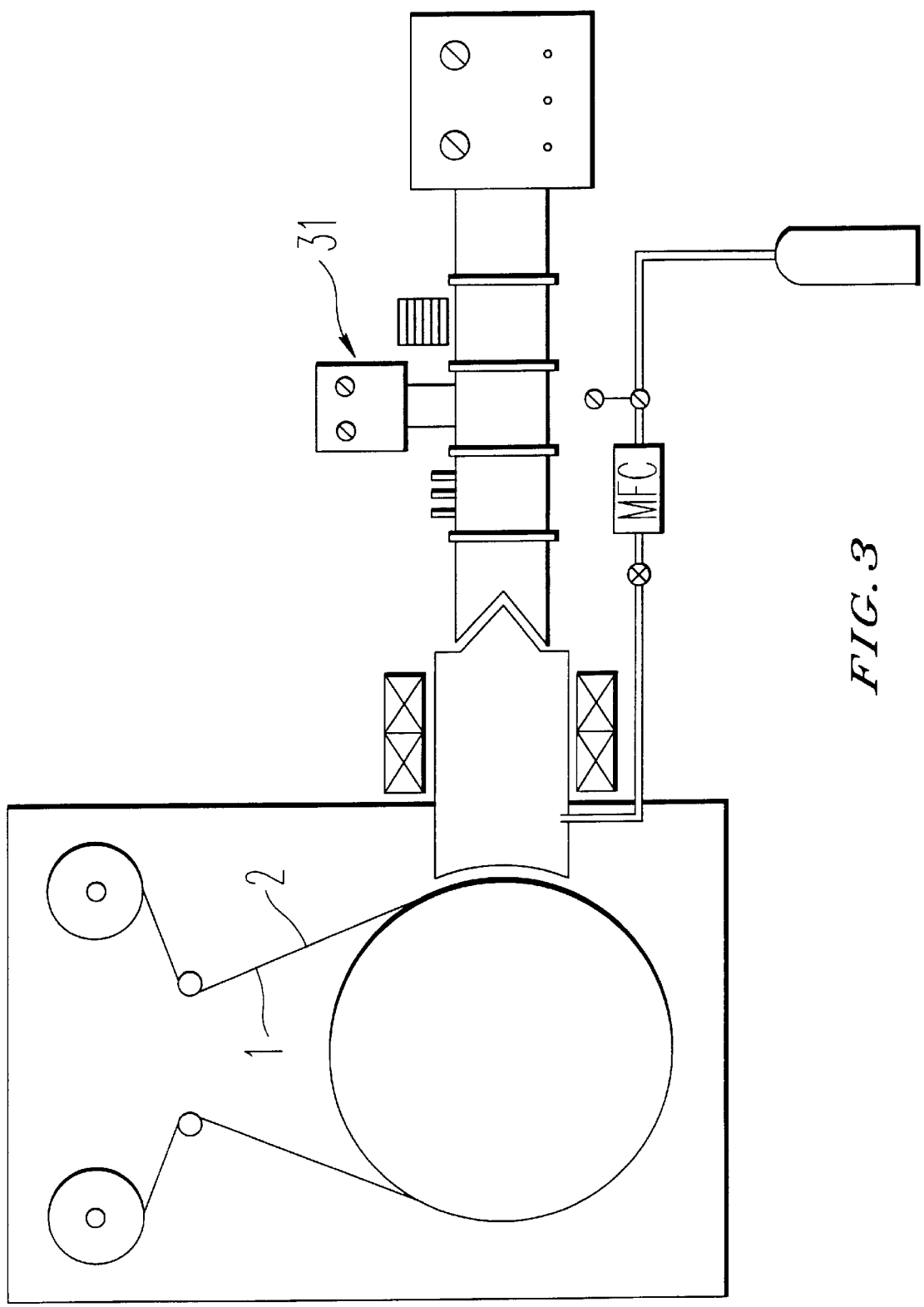
FIG. 3 is a schematic view of an apparatus for producing a protective layer of the present invention.

The protective layer 3 made of the diamond-like carbon is produced through a chemical vapor deposition (CVD) process. An ECR plasma CVD apparatus 31 shown in FIG. 3 is used in the present invention. More specifically, the substrate (magnetic layer 2) placed in the vacuum vessel is processed through the CVD apparatus 31, by which the plasma of hydrocarbon gas is sprayed to the magnetic layer 2. As a result, the protective layer (diamond-like carbon layer) is coated on the substrate (magnetic layer 2) surface. The hydrocarbon gas for forming the diamond-like carbon layer is made of a paraffin hydrocarbon such as a methane, aromatic hydro carbon such as a benzene or a cyclic hydrocarbon containing N, for example, homologue or derivative thereof. The hydrocarbon gas can be used with $H_2$, $O_2$ $N_2$, $NH_3$, $NO_2$, NO or the like.

The other (back) surface of the substrate 1 is coated with a back coat layer (non-magnetic metallic layer) 4. The back coat layer 4 is produced through various plating methods, such as deposition, DC sputtering, AC sputtering, high frequency sputtering, DC magnetron sputtering, high frequency magnetron sputtering, ion beam sputtering or the like.

Figure 4:
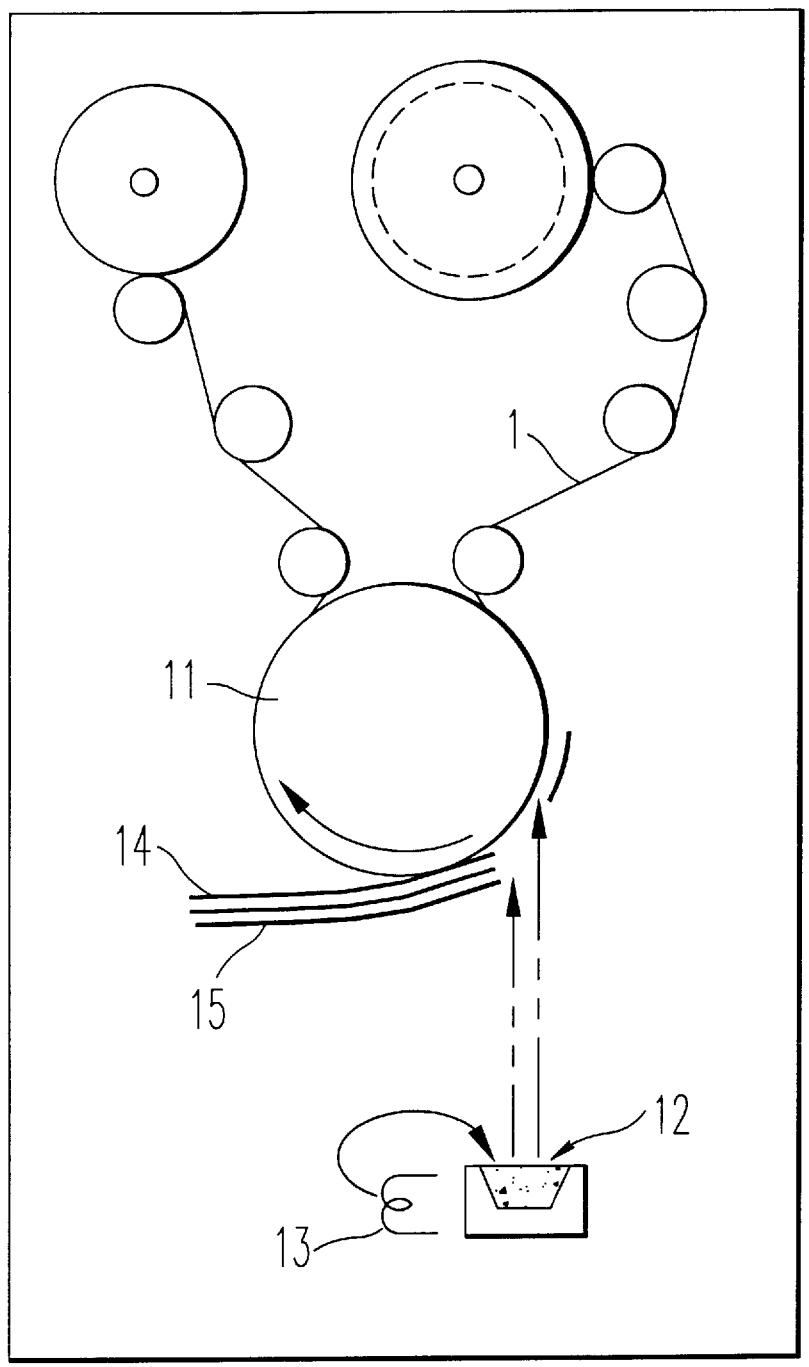
FIG. 4 is a schematic view of an apparatus for producing a back coat layer of the present invention.

FIG. 4 is a schematic view of an apparatus (apparatus for deposition) for producing the back coat layer 4. Reference numerals 1, 11, 12, 13, 14 and 15 designate a substrate, cool can roll, a metallic material, an electron gun, a nozzle and a cover plate, respectively. The electron gun 13 irradiates electron beam to the metallic material 12 for evaporation. The evaporated metallic particles are adhered and deposited on the surface of the substrate 1. The back coat layer 4 is, thus, obtained. Oxygen gas supplied through the nozzle 14 oxidizes an outermost layer of the back coat layer 4. Alternatively a highly reactive nitrogen compound supplied through the nozzle nitrides the outermost layer of the back coat layer 4. Irradiating nitrogen ion also nitrides the outermost layer of the back coat layer 4. Irradiating the carbon ion carbonizes the outermost layer of the back coat layer 4. The surface of the back coat layer 4 can be coated with ceramics through oxidation or carbonization.

The back coat layer 4 can be formed by metals such as Al, Zn, Sn, Ni, Ag, Fe, Ti or the like. The back coat layer 4 can also be formed by Cu—Al—X alloy (where X is at least one metal selected from a group consisting of Mn, Fe and Ni), Al—Si alloy, Ti alloy or the like. Preferably the Cu—Al—X alloy (where X is at least one metal selected from the group consisting of Mn, Fe and Ni) contains 70 to 90 at. % of Cu, 8 to 25 at. % of Al, 0.5 to 4 at. % of Mn, 0.4 to 5 at. % of Fe, 0.4 to 4 at. % of Ni. It is also preferable that a total content of Mn, Fe and Ni ranges from 1 to 6 at. %. It is preferable that the Al—Si alloy contains 15 to 70 at. % of Al and 15 to 70 at. % of Si.

The back coat layer 4 can be produced after forming the magnetic layer 2. Or the back coat layer 4 can be produced prior to forming the magnetic layer 2. Both the back coat layer 4 and the magnetic layer 2 can be produced through the identical process steps. Since the diamond-like carbon layer 3 is coated on the magnetic layer 2, it is preferable that the magnetic layer 2 is formed after forming the back coat layer 4.

After forming the magnetic layer 2, the diamond-like carbon layer 3 and the back coat layer 4, lubricant layers 5a and 5b are produced. The layers 5a and 5b are produced through a dipping process or ultrasonic spray process.

The lubricant is formed by, for example, a carboxyl group modified per fluoro polyether such as $—(C(R)F—CF_2—O)_p$ (where R represents a group such as F, $CF_3$, $CH_3$ or the like), especially $HOOC—CF_2(O—C_2F_4)_p(OCF_2)_q—OCF_2COOH$, $F—(CF_2CF_2CF_2O)_n—CF_2CF_2COOH$; alcohol modified per fluoro polyether such as $HOCH_2—CF_2(O—C_2F_4)_p(OCF_2)_q—OCF_2CH_2OH$, $HO—(C_2H_4—O)_m—CH_2—(O—C_2F_4)P(OCF_2)_q—OCH_2(OCH_2CH_2)_n—OH$, $F—(CF_2CF_2CF_2O)_n—CF_2CF_2CH_2OH$ or the like. The above lubricant has a molecular weight ranging from 500 to 50000. Specifically the products called "FOMBLIN Z DIAC", "FOMBLIN Z DOL", "FOMBLIN AM2001" manufactured by Monte katini Co. or "Demnum SA, SH, SY or SP" manufactured by DAIKIN Industries have been conventionally used.

EXAMPLE

[Example-1]

A back coat layer 4 formed by a Cu—Al alloy was coated on a back surface of a substrate (7 μm thick PET layer) through an apparatus shown in FIG. 4. An outer surface of the back coat layer 4 was oxidized. The back coat layer 4 had a thickness of 2000 Å.

Then an apparatus shown in FIG. 2 was used to coat a magnetic layer (Fe—C—O containing Fe=75 at. %, C=15 at. % and O=10 at. %) 2 on a surface of the PET layer 1. The thickness of the magnetic layer 2 was 1800 Å.

An apparatus shown in FIG. 3 was used to coat a diamond-like carbon layer 3 on the magnetic layer 2. The thickness of the diamond-like carbon layer 3 was 75 Å.

A reference numeral 5a is a fluorine-contained lubricant (FOMBLIN Z DIAC) layer coated on the diamond-like carbon layer 3.

A reference numeral 5b is a fluorine-contained lubricant (FOMBLIN Z DIAC) layer coated on the back coat layer 4.

Both the layers 5a and 5b were produced through the ultrasonic spray process. Each thickness of those layers 5a and 5b was 20 Å.

[Example-2]

The same way as Example-1 was done except that a composition of the obtained magnetic layer 2 was Fe=90 at. %, C=5 at. % and O=5 at. %.

[Example-3]

The same way as Example-1 was done except that a composition of the obtained magnetic layer 2 was Fe=60 at. %, C=35 at. % and O=5 at. %.

[Example-4]

The same way as Example-1 was done except that a composition of the obtained magnetic layer 2 was Fe=65 at. %, C=5 at. % and O=30 at. %.

[Comparison-1]

The same way as Example-1 was done except that a composition of the obtained magnetic layer 2 was Fe=100 at. %.

[Comparison-2]

The same way as Example-1 was done except that a composition of the obtained magnetic layer 2 was Fe=70 at. % and O=30 at. %.

[Comparison-3]

The same way as Example-1 was done except for producing an SiOx layer in place of the diamond-like carbon layer 3.

The SiOx layer was obtained with Si target through DC magnetron sputtering by supplying oxygen gas.

[Comparison-4]

The same way as Example-1 was done except for using myristic acid (lubricant) in place of the fluorine-contained lubricant.

[Characteristics]

Each magnetic tape obtained from the respective examples and comparisons was subjected to testings for reproduction output at 7 MHz, running stability, durability and corrosion resistance. The results are shown in Table-1.

The running stability was defined by the measurement value of jitter. The durability was defined by the measurement value of still durability. The corrosion resistance was defined by a drop ratio of the saturated magnetic flux density Bs after leaving each magnetic tape under the condition at 60° C. at 90% RH for one week. A commercial Hi 8 mm VTR was modified and connected to a jitter meter in order to measure the jitter. The still durability was obtained through a spectrum analyzer for measuring the output drop of luminance signals at 7 MHz when executing still reproduction for 5 hours.

TABLE 1

|   | Reproduction output (dB) | Jitter (ns) | Still durability (dB) | Corrosion resistance ΔBs (%), |
|---|---|---|---|---|
| E-1 | +7.4 | 47 | −0.8 | −4 |
| E-2 | +6.9 | 49 | −1.2 | −8 |
| E-3 | +7.1 | 46 | −0.3 | −2 |
| E-4 | +6.6 | 45 | −0.5 | −2 |
| C-1 | not available | not available | not available | −26 |
| C-2 | −3.8 | 51 | −3.5 | −17 |
| C-3 | +7.2 | 55 | −2.1 | −10 |
| C-4 | +7.0 | 69 | −2.6 | −12 |

*The reference reproduction output was derived from the metal tape of a coat type. (0dB)

The above results suggest that the magnetic recording medium comprising the Fe—C—O metal magnetic layer, the diamond-like carbon layer and the fluorine-contained lubricant layer exhibits more excellent characteristic than those of comparisons-1, -2, -3 and -4, each of which lacks at least one requirement for the above components.

For example, comparing Example-1 with Comparison-1 or Comparison-2 shows that lack of the requirement for the Fe—C—O metal magnetic layer degraded the electromagnetic conversion characteristics, running capability, durability and corrosion resistance in spite of satisfying other requirements for the diamond-like carbon layer, fluorine-contained lubricant layer and the back coat layer.

Comparing Example-1 with Comparison-3 shows that lack of the requirement for the diamond-like carbon layer degraded the durability in spite of satisfying other requirements for the Fe—C—O metal magnetic layer, fluorine-contained lubricant layer and back coat layer.

Comparing Example-1 with Comparison-4 shows that lack of the requirement for the fluorine-contained lubricant layer degraded the running capability and durability in spite of satisfying other requirements for the Fe—C—O metal magnetic layer, diamond-like carbon layer and back coat layer.

What is claimed is:

1. A magnetic recording medium comprising a substrate, a magnetic layer, a protective layer and a lubricant layer, wherein;

said magnetic layer is coated on said substrate, said protective layer is coated on said magnetic layer, said lubricant layer is coated on said protective layer, said magnetic layer is an Fe—C—O metal magnetic layer containing Fe, C and O, said protective layer is a diamond-like carbon layer, and said lubricant is a fluorine-contained lubricant.

2. The magnetic recording medium of claim 1, wherein said magnetic layer is composed of 50 to 90 at. % of Fe, 5 to 35 at. % of C and 5 to 35 at. % of O.

3. The magnetic recording medium of claim 1, wherein said magnetic layer is composed of 60 to 86 at. % of Fe, 7 to 25 at. % of C and 7 to 25 at. % of O.

4. The magnetic recording medium of claim 1, wherein a thickness of said magnetic layer is in a range from 800 to 5000 Å.

5. The magnetic recording medium of claim 1, wherein a thickness of said magnetic layer is in a range from 1000 to 3000 Å.

6. The magnetic recording medium of claim 1, wherein said protective layer is a diamond-like carbon layer produced through a chemical vapor deposition process.

7. The magnetic recording medium of claim 1, wherein a thickness of said protective layer is in a range from 10 to 500 Å.

8. The magnetic recording medium of claim 1, wherein a thickness of said protective layer is in a range from 30 to 200 Å.

9. The magnetic recording medium of claim 1, wherein a thickness of said lubricant layer is in a range from 5 to 70 Å.

10. The magnetic recording medium of claim 1, wherein a surface of said substrate other than being coated with said magnetic layer is coated with a back coat layer which is a non-magnetic metallic layer.

11. The magnetic recording medium of claim 10, wherein a thickness of said back coat layer is in a range from 1000 to 5000 Å.

12. The magnetic recording medium of claim 10, wherein a lubricant layer is coated on said back coat layer and said lubricant is a fluorine-contained lubricant.

13. The magnetic recording medium of claim 12, wherein a thickness of said lubricant layer is in a range from 5 to 70 Å.

14. A magnetic recording medium comprising a substrate, a magnetic layer, a protective layer, a back coat layer and a lubricant layer, wherein said magnetic layer is coated on one surface of said substrate, said protective layer is coated on said magnetic layer, said back coat layer is coated on the other surface of said substrate, said lubricant layer is coated on said protective layer and said back coat layer, said magnetic layer is an Fe—C—O metal magnetic layer composing 50 to 90 at. % of Fe, 5 to 35 at. % of C and 5 to 35 at. % of O, said protective layer is a diamond-like carbon layer, said back coat layer is a non-magnetic metallic layer and said lubricant is a fluorine-contained lubricant.

15. The magnetic recording medium of claim 14, wherein said magnetic layer is composed of 60 to 86 at. % of Fe, 7 to 25 at. % of C and 7 to 25 at. % of O.

16. The magnetic recording medium of claim 14, wherein a thickness of said magnetic layer is in a range from 800 to 5000 Å.

17. The magnetic recording medium of claim 14, wherein said protective layer is a diamond-like carbon layer produced through a chemical vapor deposition process.

18. The magnetic recording medium of claim 14, wherein a thickness of said protective layer is in a range from 30 to 200 Å.

19. The magnetic recording medium of claim 14, wherein a thickness of said lubricant layer is in a range from 5 to 70 Å.

20. The magnetic recording medium of claim 14, wherein a thickness of said back coat layer is in a range from 1000 to 5000 Å.

* * * * *